March 25, 1924. 1,487,920
L. J. DAWSON
EMERGENCY TIRE
Filed Oct. 16, 1922 2 Sheets-Sheet 1

L. J. Dawson
INVENTOR
BY Victor J. Evans
ATTORNEY

WITNESS:

March 25, 1924.

L. J. DAWSON

EMERGENCY TIRE

Filed Oct. 16, 1922

L. J. Dawson
INVENTOR

BY Victor J. Evans
ATTORNEY

UNITED STATES PATENT OFFICE.

LAWRENCE J. DAWSON, OF KANSAS CITY, MISSOURI.

EMERGENCY TIRE.

Application filed October 16, 1922. Serial No. 594,886.

*To all whom it may concern:*

Be it known that I, LAWRENCE J. DAWSON, a citizen of the United States, residing at Kansas City, in the county of Jackson and State of Missouri, have invented new and useful Improvements in Emergency Tires, of which the following is a specification.

The object of this invention is to provide an emergency tire for motor vehicles, which is adapted to be substituted for a worn out tire so that the vehicle can proceed to a service station or the like where a new tire can be secured.

Another object of the invention is to so form the device that it can be easily and quickly placed on the wheel and when not in use can be folded so that it will occupy but a small amount of space.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
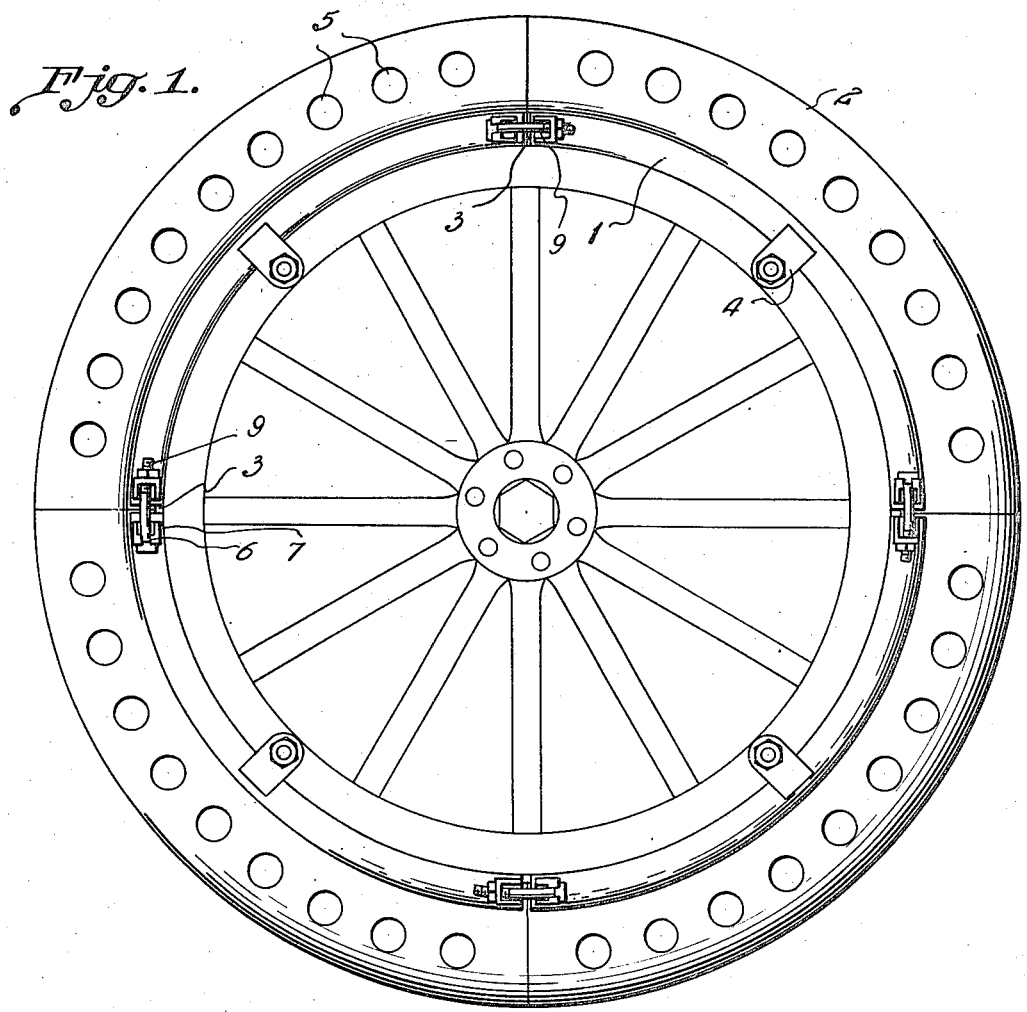
Figure 1 is an elevation of a wheel showing the invention in use.
Figure 3:
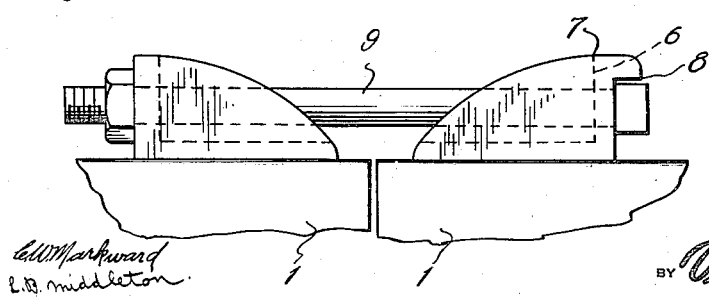
Figure 3 is a fragmentary plan view showing the adjacent ears of two sections operatively associated.
Figure 2:
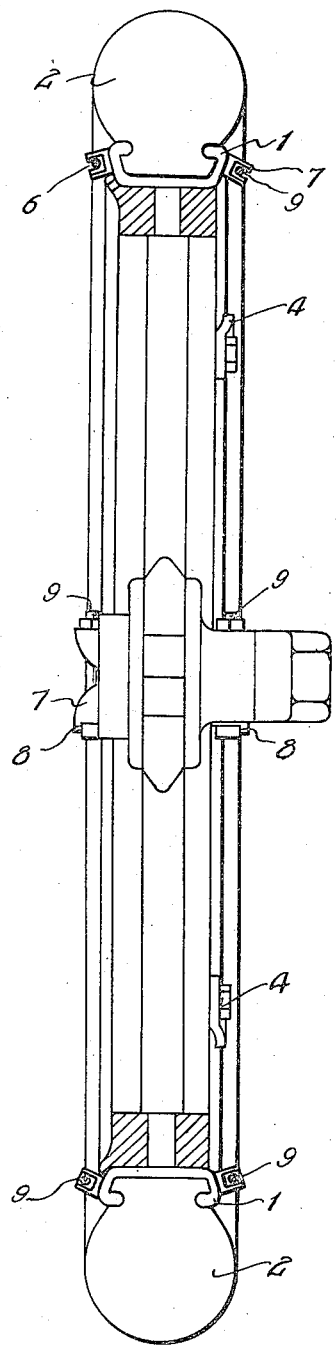
Figure 2 is central vertical sectional view taken through Figure 1.
Figure 4:
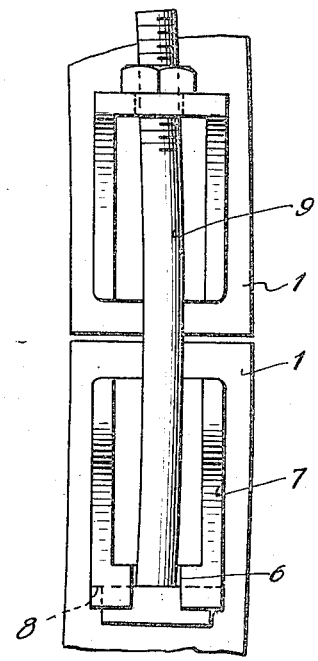
Figure 4 is a side elevation thereof.

As shown in these views the emergency tire comprises the rim 1 and the tire 2, both the rim and tire being formed of sections which have their ends abutting, as shown at 3. The rim is held to the felly of the wheel by the usual lugs 4 or in any other desired manner. The tire 2 is formed of solid rubber with holes 5 therein to add to its resilient qualities. The tire 2 may be secured to the rim 1 in any desired manner, though I prefer to make the tire rim of the well known clincher type, as shown. The sides of the rim are provided with ears 7 which are placed adjacent the ends of the sections of the ring. These ears are of channel shape with one ear having a notch 6 therein and the cooperating ear having a hole therein and the notched ear having projections 8 for engaging the head of the bolt 9 for preventing turning of the bolt when the nut is being screwed thereon. The threaded end of the bolt passes through the hole in the unnotched ear. The notch in the other ear permits the bolt to be placed therein very easily. Thus when the nuts are screwed tight on the bolts the sections will have their ends brought together so as to make a complete tire and rim. When not in use the sections are separated from each other so that the device can be placed under the seat or in the tool box.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

An emergency tire of the character described comprising a segmental rim, channel shaped ears adapted to be arranged in pairs when the sections of said rims are associated and formed on each end of said section, angle bent walls formed on one edge of each ear and the wall of one ear of each pair being provided with a notch and the wall of the opposite ear having an opening therein, parallel projections extending from the notched wall extending outwardly from the notched wall and a bolt arranged in each pair of ears and having its head end underlying the projections and its opposite end passing through the opening of the companion ear as and for the purpose specified.

In testimony whereof I affix my signature.

LAWRENCE J. DAWSON.